(12) United States Patent
Grunnet-Jepsen et al.

(10) Patent No.: US 7,189,497 B2
(45) Date of Patent: Mar. 13, 2007

(54) METHOD FOR WRITING A PLANAR WAVEGUIDE HAVING GRATINGS OF DIFFERENT CENTER WAVELENGTHS

(75) Inventors: Anders Grunnet-Jepsen, San Jose, CA (US); Alan E. Johnson, San Jose, CA (US); John N. Sweetser, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 217 days.

(21) Appl. No.: 10/205,089

(22) Filed: Jul. 24, 2002

(65) Prior Publication Data

US 2004/0018022 A1  Jan. 29, 2004

(51) Int. Cl.
*G02B 6/134* (2006.01)
*G02B 5/18* (2006.01)

(52) U.S. Cl. .......................... 430/321; 430/290; 385/14
(58) Field of Classification Search ................. 430/321, 430/290; 385/14
See application file for complete search history.

(56) References Cited

U.S. PATENT DOCUMENTS

| | | | |
|---|---|---|---|
| 4,585,307 | A | 4/1986 | Dammann et al. |
| 5,064,290 | A | 11/1991 | McMurtry et al. |
| 5,416,866 | A | 5/1995 | Sahlen |
| 5,420,948 | A | 5/1995 | Byron |
| 5,848,207 | A | 12/1998 | Uetsuka et al. |
| 6,175,670 | B1 | 1/2001 | Bergmann |
| 6,365,428 | B1 | 4/2002 | Zubrzycki et al. |
| 6,522,812 | B1 | 2/2003 | Nikonov |
| 6,638,773 | B1 | 10/2003 | Hwang et al. |

FOREIGN PATENT DOCUMENTS

| | | |
|---|---|---|
| EP | 0805365 A2 | 11/1997 |
| EP | 1074865 A2 | 2/2001 |
| JP | 08220356 | 8/1996 |
| JP | 10-090508 A * | 4/1998 |
| WO | WO 0067054 | 11/2000 |
| WO | WO 02/49169 A1 | 6/2002 |
| WO | PCT/US 03/21124 | 3/2004 |

OTHER PUBLICATIONS

Madsen, C.K. et al., "Apodized UV–induced Gratings in Planar waveguides for Compact Add–Drop Filters," Bragg Gratings, Photosensitivity, and Poling in Grass Fibers and Waveguides: Applications and Fundamentals, Technical Digest, Postconference Edition, pp. 2262–264.

Mechin, David et al., "Add–Drop Multiplexer With UV–Written Bragg Gratings and Directional Coupler in $SiO_2$–Si Integrated Waveguides," *Journal of Lightwave Technology*, vol. 19, No. 9, Sep. 2001, pp. 1282–1286.

Bradley, Eric M. et al., "Control of Bragg Grating Resonant Wavelength Through Its Dependence on the Effective Index of a Waveguide," *Journal of Lightwave Technology*, vol. 15, No. 7, Jul. 1997, pp. 1156–1164.

Rocha, Monica L. et al., "System Impact of the Physical Length of Unapodized Chirped Fiber Bragg Gratings on Dispersion Compensation," *IEEE Transactions on Microwave Theory and Techniques*, vol. 50, No. 1, Jan. 2002, pp. 88–93.

Okude, Satoshi et al., "A Novel Chirped Fiber Bragg Grating Utilizing Thermal Diffusion of Core Dopant," *IEICE Transactions on Communications*, vol. E80–B, No. 4, Apr. 1997, pp. 551–556.

Aslund, M. et al., "Locking in Photosensitivity Within Optical Fiber and Planar Waveguides by Ultraviolet Preexposure," *Optics Letters*, vol. 24, No. 24, Dec. 15, 1999, pp. 1826–1828.

Guan, Bai–Ou et al., "Highly Stable Fiber Bragg Gratings Written in Hydrogen–Loaded Fiber," *IEEE Photonics Technology Letters*, vol. 12, No. 10, Oct. 2000, pp. 1349–1351.

Kawano, Hiroyuki et al., "Reduction of Transmission Spectrum Shift of Long–Period Fiber Gratings by a UV–Preexposure Method," *Journal of Lightwave Technology*, vol. 19, No. 8, Aug. 2001, pp. 1221–1228.

Tchebotareva, A.L. et al., "Effect of Proton Implantation on the Photosensitivity of SMF–28 Optical Fiber," *Nuclear Instruments and Methods in Physics Research*, Section B: Beam Interactions with Materials and Atoms, vol. 148, No. 1–4, 1999, pp. 687–691.

\* cited by examiner

*Primary Examiner*—John A McPherson
(74) *Attorney, Agent, or Firm*—Blakely, Sokoloff, Taylor & Zafman LLP

(57) ABSTRACT

Multiple Bragg gratings are fabricated in a single planar lightwave circuit platform. The gratings have nominally identical grating spacing but different center wavelengths, which are produced using controlled photolithographic processes and/or controlled doping to control the effective refractive index of the gratings. The gratings may be spaced closer together than the height of the UV light pattern used to write the gratings.

17 Claims, 5 Drawing Sheets

METHOD FOR WRITING A PLANAR WAVEGUIDE HAVING GRATINGS OF DIFFERENT CENTER WAVELENGTHS

FIELD OF THE INVENTION

The present invention relates to waveguide gratings and more particularly to a method for writing waveguide gratings having different center wavelengths.

BACKGROUND INFORMATION

An optical telecommunication system transmits information from one place to another by way of a carrier whose frequency is in the visible or near-infrared region of the electromagnetic spectrum. Such a carrier is sometimes referred to as an optical signal, an optical carrier, or a lightwave signal. Optical fibers transport the lightwave signal, each of which includes several channels. A channel is a specified frequency band of an electromagnetic signal, and is sometimes referred to as a wavelength. Multiple channels are commonly transmitted over the same optical fiber to take advantage of the unprecedented capacity offered by optical fibers. Essentially, each channel has its own wavelength, and all wavelengths are separated enough to prevent overlap. Typically, hundreds or thousands of channels are interleaved by a multiplexer, launched into the optical fiber, and separated by a demultiplexer at a receiver. Along the way, channels may be added or dropped using add/drop multiplexers (ADM) or switched using optical cross-connects (OXC).

Wavelength division multiplexing (WDM) facilitates propagation of multiple channels in a single optical fiber. Wavelength division demultiplexing elements separate the individual wavelengths using frequency-selective components such as optical gratings, which can provide high reflectivity and high wavelength selectivity with the aim of increasing the transmission capacity of optical fibers. One such optical grating is a Bragg grating (e.g. in fiber or in planar waveguides), which selectively transmits or reflects specific wavelengths of light propagating within the optical fiber.

A Bragg grating is a portion of an optical fiber or planar waveguide that has a refractive index profile, which varies periodically along the length of the optical fiber. The center wavelength profile of a Bragg grating is determined by the following equation:

$$\lambda = 2n\Lambda \quad \text{(Equation 1)}$$

where $\lambda$ is the center (or Bragg) wavelength, n is the mean effective refractive index, and $\Lambda$ is the period of the grating (or grating spacing).

Simple periodic fiber Bragg gratings are known in the art and many different methods have been described for fabricating fiber Bragg gratings. One characteristic of fiber Bragg gratings is that, as Equation 1 indicates, to change the center wavelength profile, one can change the refractive index or the grating spacing. Prior art techniques focus on changing the grating spacing, which is accomplished by changing the interference pattern used to define the grating profile. The interference pattern is changed by changing the inter beam angle between two overlapping interfering ultraviolet (UV) light beams used to expose the optical fiber or by changing a phase mask through which UV light is shined.

Changing the phase mask or the inter beam angle tends to be expensive, cumbersome, and labor intensive, however, especially when trying to fabricate several different types of fiber Bragg gratings for the myriad filtering and other applications in optical communication systems. For example, to fabricate fiber Bragg gratings with different center wavelength profiles the writing apparatus is set to different wavelengths, currently by replacing the phase masks. To write long fiber Bragg gratings the optical fiber is translated on long-travel stages to expose new portions of the photosensitive optical fiber to UV light. Similarly, to write chirped broadband fiber-based gratings chirped masks are generally used and new phase masks are used for each new chirp profile. Additionally, writing individual Bragg gratings into separate optical fibers commonly requires time consuming multiple exposures and extensive handling of optical fibers to control the optical fibers.

BRIEF DESCRIPTION OF THE DRAWINGS

In the drawings, like reference numbers generally indicate identical, functionally similar, and/or structurally equivalent elements. The drawing in which an element first appears is indicated by the leftmost digit(s) in the reference number.

DETAILED DESCRIPTION OF THE ILLUSTRATED EMBODIMENTS

Embodiments of the present invention are directed to fabrication of waveguide gratings. In the following description, numerous specific details, such as particular processes, materials, devices, and so forth, are presented to provide a thorough understanding of embodiments of the invention. One skilled in the relevant art will recognize, however, that the embodiments of the present invention can be practiced without one or more of the specific details, or with other methods, components, etc. In other instances, well-known structures or operations are not shown or described in detail to avoid obscuring the understanding of this description.

Some parts of this description will be presented using terms such as wavelength, silicon, taper, grating, chirp, and so forth. These terms are commonly employed by those skilled in the art to convey the substance of their work to others skilled in the art.

Various operations will be described as multiple discrete blocks performed in turn in a manner that is most helpful in understanding embodiments of the invention. However, the order in which they are described should not be construed to imply that these operations are necessarily order dependent or that the operations be performed in the order in which the blocks are presented.

Reference throughout this specification to "one embodiment" or "an embodiment" means that a particular feature, structure, process, block, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
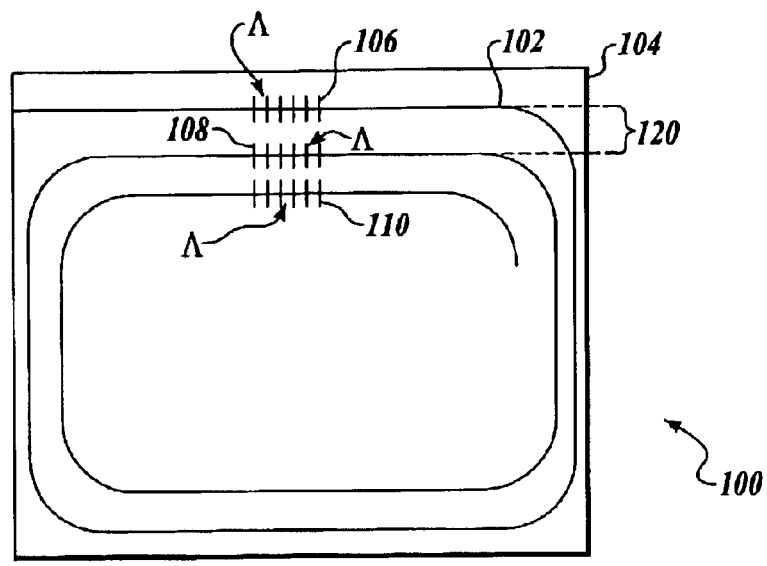
FIG. 1 is a schematic diagram of a photonic device according to an embodiment of the present invention.

FIG. 1 is a schematic diagram of a photonic device 100 according to an embodiment of the present invention. The photonic device 100 includes a single waveguide 102 formed in or on a planar lightwave circuit (PLC) platform 104. The waveguide 102 includes several cascaded gratings 106, 108, and 110.

The waveguide 102 may have a circular pattern (as depicted in FIG. 1) or other layout. The waveguide 102 may be a single mode waveguide. Alternatively, the waveguide 102 may be a multimode waveguide.

The PLC platform 104 may be any suitable PLC platform manufactured using appropriate semiconductor processing equipment. For example, the platform 102 may be a silica-on-silicon platform, a lithium niobate (LiNbO$_3$) platform, a gallium arsenide (GaAs) platform, an indium phosphide (InP) platform, a silicon-on-insulator (SOI) platform, a silicon oxynitride (SiON) platform, a polymer platform, or other suitable planar lightwave circuit (PLC) platform.

The gratings 106, 108, and 110 may be Bragg gratings whose grating spacing ($\Lambda$) are nominally identical but whose center wavelength are different because each grating 106, 108, and 110 is doped with a different concentration and/or type of dopant to give the grating regions of the waveguides 106, 108, and 110 different effective refractive indices after being written. The grating regions of the waveguides are the locations where gratings will be written. The dopant may be any suitable photosensitive material, such boron (B), germanium (Ge), and/or phosphorous (P). The refractive index of such a doped region will change depending on the UV "dosage". Thus, if the UV light has a periodically varying intensity pattern (as is the case when writing a grating), after UV exposure the doped region will have a periodically varying refractive index, thereby forming a grating.

In another embodiment, the refractive indices may be modulated locally through hydrogenating the sample and pre-exposing selected sections with UV light. After hydrogen out-gassing, these sections remain photosensitive. The UV dosage controls the average refractive index as well as the induced photosensitivity. On example of hydrogenating is described in more detail below in conjunction with FIG. 3.

The gratings 106, 108, and 110 may be close together (e.g., spacing 120 can be less than the height of the UV light intensity pattern used to write the gratings 106, 108, and 110). By arranging the gratings closely together, the gratings may be written in one exposure in some embodiments.

One or more of the gratings 106, 108, and 110 may be longer than the length of the UV light beam used to write the gratings. In one embodiment of the present invention, the UV light beam is one centimeter long and the grating 106 is two centimeters long. In other embodiments, the dimensions of the UV light beam and/or the gratings may be different.

Figure 2:
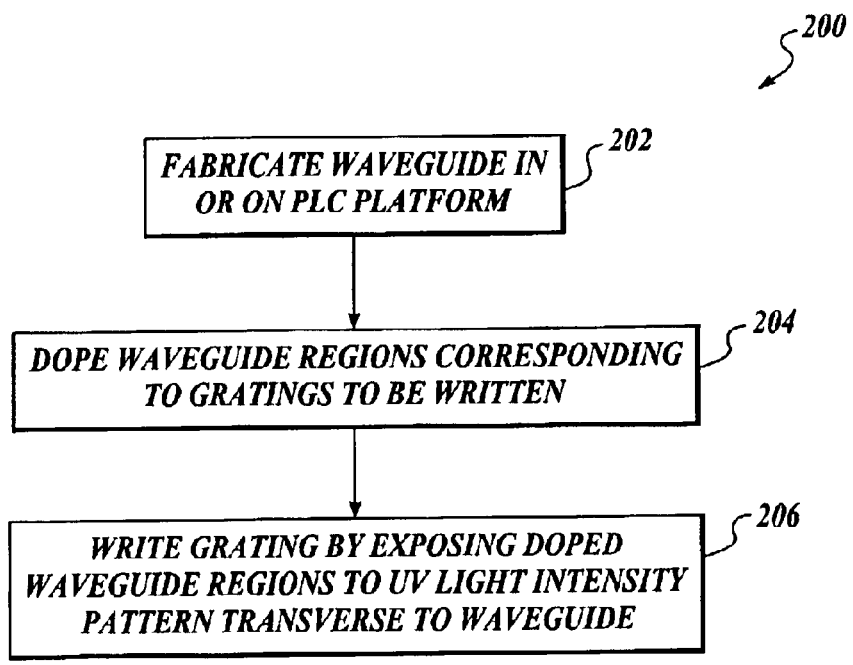
FIG. 2 is a flowchart illustrating an approach to fabricating the photonic device in FIG. 1 according to embodiments of the present invention.

FIG. 2 is a flowchart illustrating a process 200 for making the photonic device 100 (FIG. 1) according to embodiments of the present invention. A machine-readable medium with machine-readable instructions thereon may be used to cause a processor to perform the process 200. Of course, the process 200 is only an example process and other processes may be used. The order in the process 200 are described should not be construed to imply that these operations are necessarily order-dependent or that the operations be performed in the order in which the blocks are presented.

Referring to FIGS. 1 and 2, an operation 202 is performed to fabricate the waveguide 102 in or on a PLC platform using standard semiconductor fabrication techniques. These fabrication techniques can include implantation, doping, evaporation, physical vapor deposition, ion assisted deposition, photolithography, magnetron sputtering, electron beam sputtering, masking, reactive ion etching, and/or other semiconductor fabrication techniques well known to those of ordinary skill in the art. For example, in one embodiment, the waveguide 102 has a core formed from oxide such as silica.

Still referring to FIGS. 1 and 2, an operation 204 is performed to dope selected regions of the waveguide 102 that will serve as the gratings. For example, a temporary mask layer can be formed on the waveguides, which is then patterned to define the grating regions in the waveguides. This process can be performed before the top cladding layer is deposited. In some embodiments, this process can be performed after the top cladding layer is formed so that the top cladding layer can be doped instead of the core layer. In this alternative embodiment, the evanescent field of the propagating light can be affected by a grating written in cladding layer. Alternatively, the cladding can be patterned and etched to define the grating regions, with the cladding layer itself serving as a mask for the doping process. The grating regions are then selectively doped (described below).

The grating regions are selectively doped with a predetermined concentration or a predetermined composition of one or more photosensitive materials. In some embodiments, the dopants include boron (B), germanium (Ge), and/or phosphorous (Ph). The grating regions can be doped using any suitable doping processes such as, for example, ion implantation, diffusion from spin-on solutions, or other current or future techniques.

In one embodiment, the region of waveguide 102 corresponding to the grating 106 is doped with a first predetermined concentration of germanium, which gives the grating 106 a first refractive index and a first center wavelength. Similarly, the region of waveguide 102 region corresponding to the grating 108 is doped with a second predetermined concentration of germanium, which gives the grating 108 a second refractive index and a second center wavelength. Likewise, the region of waveguide 102 corresponding to the grating 110 is doped with a third predetermined concentration of germanium, which gives the grating 110 a third refractive index and a third center wavelength. In one embodiment of the present invention, dopant concentrations may vary the refractive index of the waveguide regions for the gratings 106, 108, and 110 by approximately 0.2 percent to shift the center wavelength by 0.2 percent or 30 nm at 1550 nm. Gratings can then be written in doped regions of waveguide 102 (FIG. 1) as described below.

Again referring to FIGS. 1 and 2, an operation 206 is performed to expose one or more of the doped regions of waveguide 102 (corresponding to the gratings 106, 108, and/or 110) to an UV light intensity pattern in a direction transverse to the waveguide 102. This UV light intensity pattern determines the grating spacing for the gratings 106, 108, and 110. In one embodiment, the exposure writes all gratings simultaneously so that the gratings 106, 108 and 110 all have the substantially the same grating spacing. In other embodiments, each of the gratings may be written individually, or any subset of the gratings may be written simultaneously.

In one embodiment, a suitable KrF excimer laser/phase mask unit is used to expose the doped regions of waveguide 102 (FIG. 1) corresponding to the gratings 106, 108, and 110 to a selected UV light intensity pattern. Because the regions were doped differently from each other, the resulting waveguide gratings will generally have different center wavelengths even though the grating spacing is substantially identical. In one embodiment, the grating 106 has a center wavelength of 1555 nm, the grating 108 has a center wavelength of 1520 nm, and grating 110 has a center wavelength of 1560 nm.

For example, a KrF excimer laser/phase mask unit can be configured to output the UV light intensity pattern with a height of 300 microns. In one embodiment, the regions of waveguide 102 for the gratings 106, 108, and 110 are arranged so that the total area occupied by the doped regions for gratings 106, 108 and 110 has a height that is less than 300 microns. The resulting photonic device is more compact and allows portions of all three gratings to be written simultaneously in a single exposure. Additionally, no wide-bandwidth tuning of the individual exposure (interbeam angle) is needed to tune the waveguide gratings to a center wavelength.

In an embodiment of the present invention in which one or more of gratings is to be longer than the length of an UV light beam used to expose the gratings, the region of the waveguide for the grating may be folded such that the entire grating can be written in the same exposure. For example, in embodiments in which the UV light beam is one centimeter, the grating may be two centimeters long but be folded into one-centimeter (or less) portions. In this case, the resulting grating has gaps (i.e. sections of waveguide where there is no grating written) between the grating segments. Such devices are known as sampled or segmented Bragg gratings.

The photonic device 100 may be implemented as a waveguide filter to compensate for chromatic dispersion. Chromatic dispersion is the temporal separation of the constituent colors of a lightwave pulse and can be problematic because it causes channel amplitudes to vary and causes adjacent data bits or pulses to bleed into each other, causing inter-symbol interference (ISI). In an optical fiber, dispersion occurs because different wavelengths propagate at different speeds. Compensation for dispersion in optical fiber networks becomes increasingly important as bit rates increase because the bits (optical pulses) are now spaced closer together and the shorter pulses contain a larger span of bandwidth.

The photonic device 100, when operating, receives a multiplexed lightwave signal, which enters the waveguide 102 and is incident on the gratings 106, 108, and 110. The multiplexed lightwave signal has several single channel lightwave signals each with its own center wavelength profile. According to embodiments of the present invention, the grating 106 reflects a first wavelength (e.g., 1535 nm) and passes other wavelengths, the grating 108 reflects second wavelength (e.g., 1550 nm) and passes other wavelengths, and the grating 110 reflects a third wavelength (e.g., 1565 nm) and passes other wavelengths. In another embodiment, each grating has a chirped grating spacing, which serves to compensate for dispersion experienced by the data stream propagating on that wavelength.

Figure 3:
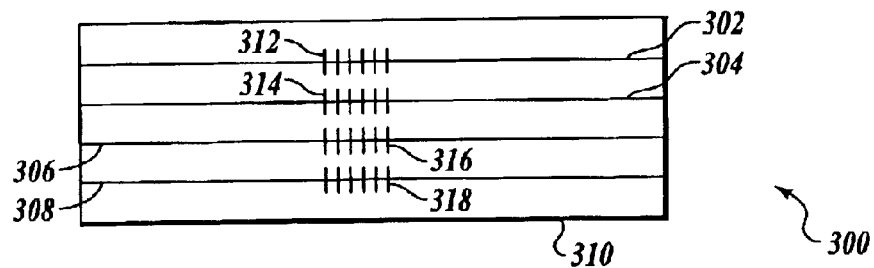
FIG. 3 is a schematic diagram of a photonic device according to an alternative embodiment of the present invention.

FIG. 3 is a schematic diagram of a photonic device 300 according to an embodiment of the present invention. The photonic device 300 includes several waveguides 302, 304, 306, and 308 formed in or on a PLC platform 310. The wave-guides 302, 304, 306, and 308 include a grating 312, 314, 316, and 318, respectively. The platform 310 is similar to the platform 104. The waveguides 302, 304, 306, and 308 may be similar to the waveguide 102.

The gratings 312, 314, 316, and 318 may be Bragg gratings whose grating spacings are nominally identical but whose center wavelengths are different because each grating 312, 314, 316, and 318 has a different geometry (e.g., width, depth, height) to give these grating regions different effective refractive indices. In one embodiment of the present invention, the grating 312 may be seven microns wide, the grating 314 may be six microns wide, the grating 316 may be five microns wide, and the grating 318 may be four microns wide.

In one embodiment of the present invention, one or more sections of the waveguides 302, 304, 306, and 308 are loaded with hydrogen (mentioned above as hydrogenating). Such hydrogen loading improves the photosensitivity of the waveguide by orders of magnitude and changes the effective refractive indices of the one or more of the loaded sections of waveguides 302, 304, 306, and/or 308. For example, hydrogen may be selectively implanted in the regions of the waveguides 302, 304, 306, and 308 corresponding to the gratings 312, 314, 316, and 318. The hydrogen can be implanted through ion implantation or localized brushing with a hydrogen flame. The hydrogen loading will increase the photosensitivity locally and allow for the generation of different refractive indices for similar levels of UV exposure. In this embodiment, the wavelength strength (reflectivity) and center-wavelength are directly coupled during UV writing of the Bragg gratings.

In other embodiments of the present invention, one or more sections of the waveguides 302, 304, 306, and 308 are selectively pre-exposed or post-exposed to different levels of uniform UV radiation. This serves to change the average refractive index of individual waveguides and shift the center-wavelengths of the gratings 312, 314, 316, and 318.

Figure 4:
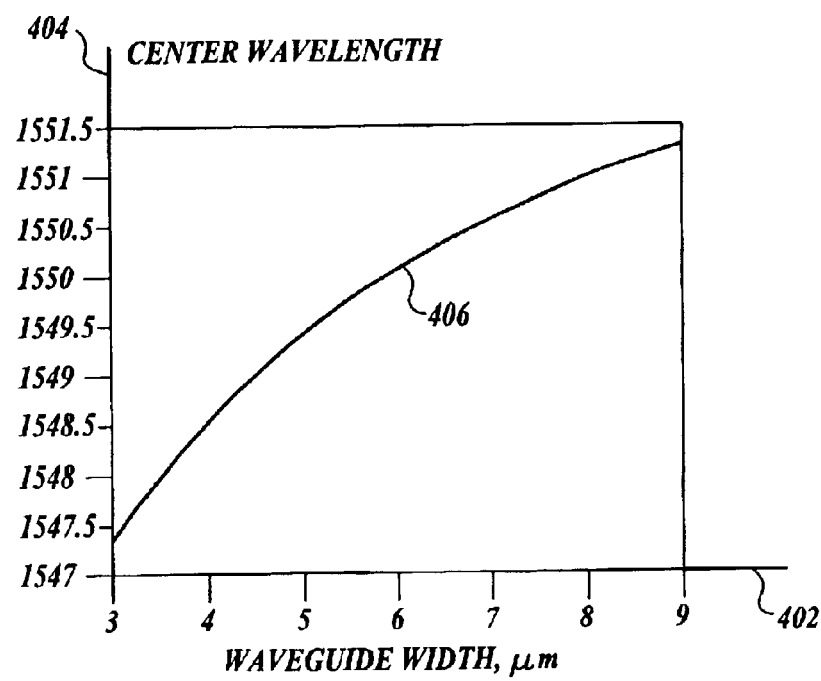
FIG. 4 is a graph illustrating an approach to fabricating the photonic device in FIG. 3 according to embodiments of the present invention.

FIG. 4 is a graphical representation 400 illustrating the relationship between the width of a waveguide and the center wavelength of a Bragg grating written in the waveguide according to an embodiment of the present invention. The graphical representation 400 includes an "x" axis 402, which represents waveguide width in micrometers (µm), and a "y" axis 404, which represents wavelength in nanometers (nm). The graphical representation 400 includes a curve 406, which represents the change in center wavelength of a Bragg grating written in the waveguide as the width of the waveguide changes. Note that in FIG. 4, as the width of the waveguide increases, the center wavelength also increases.

Figure 5:
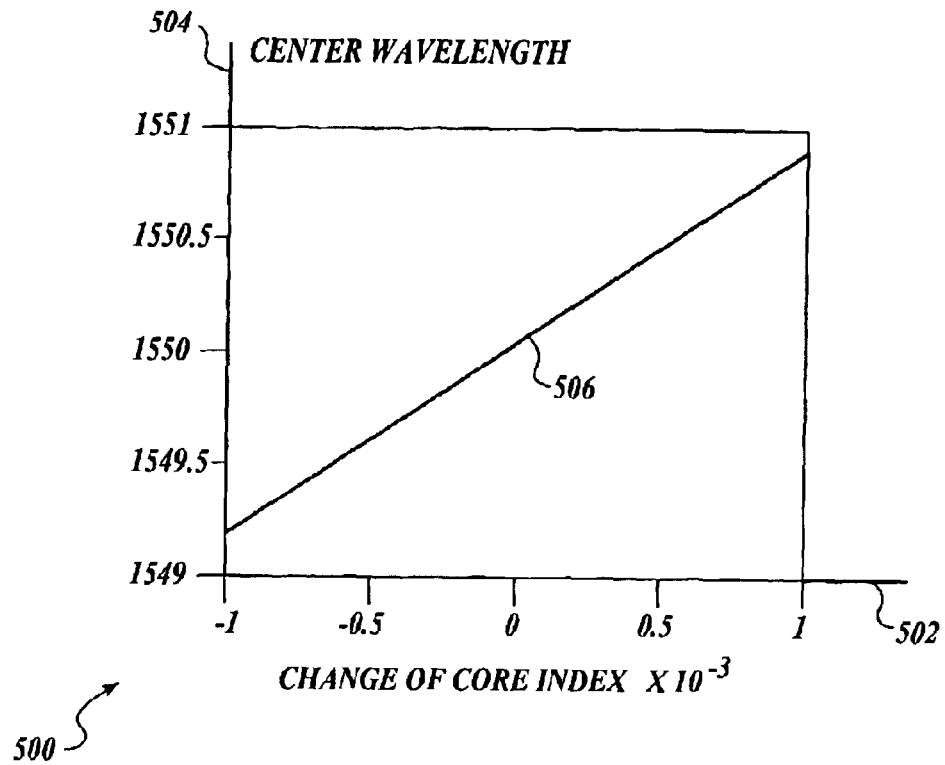
FIG. 5 is a schematic diagram of a photonic device according to another embodiment of the present invention.

In another embodiment, the gratings 312, 314, 316, and 318 may be Bragg gratings whose grating spacings are nominally identical but whose center wavelengths are different because the core of one or more of the waveguides 302, 304, 306, and/or 308 in the grating regions has a been doped so that the grating regions have different effective refractive indices. FIG. 5 is a graphical representation 500 illustrating the relationship between the refractive index of a waveguide core and the center wavelength of a Bragg grating written in the waveguide according to an embodiment of the present invention.

The graphical representation 500 includes an "x" axis 502, which represents core index of refraction, and a "y" axis 504, which represents wavelength in nanometers. The graphical representation 500 includes a curve 506, which represents the change in center wavelength of a Bragg grating written in the waveguide as the index of refraction of the waveguide changes. Note that in FIG. 5, as the refractive index of the waveguide increases, the center wavelength also increases. In one embodiment, the cores may be doped with different concentrations of dopants according to embodiments of the present invention to vary the refractive index of gratings written in the waveguides. In another embodiment, the cores may be doped with different dopant compositions (e.g., aluminum, boron, phosphorous) according to embodiments of the present invention to vary the refractive index of gratings written in the waveguides.

In still another embodiment, the gratings 312, 314, 316, and 318 may be Bragg gratings whose grating spacing are nominally identical but whose center wavelengths are different because the cladding of the waveguides 302, 304, 306, and/or 308 in the grating regions have different effective refractive indices. For example, layers of SiO may be grown on a Si substrate using plasma enhanced chemical vapor deposition (PECVD) techniques. The Si substrate may be nominally fifteen microns thick. A lower cladding layer may be deposited on the Si substrate under the layers of SiO. A core layer may be formed using the SiO doped with germanium and/or boron, which may increase the refractive index of the SiO. The core layer may be six microns thick. Portions of the core layer may be wet-etched to leave a pattern for the waveguides 302, 304, 306, and/or 308. Germanium, boron, or other suitable dopants may be doped in the core layer of the waveguides 302, 304, 306, and/or 308 in the grating regions for each grating 312, 314, 316, and 318 using ion implantation, for example. An upper cladding layer may be deposited on the core layer. The upper cladding layer may doped with phosphorous and/or boron. The upper cladding layer may have a thickness of around fifteen to twenty microns. The refractive index of the upper cladding layer is similar to the refractive index of lower cladding layer.

Figure 6:
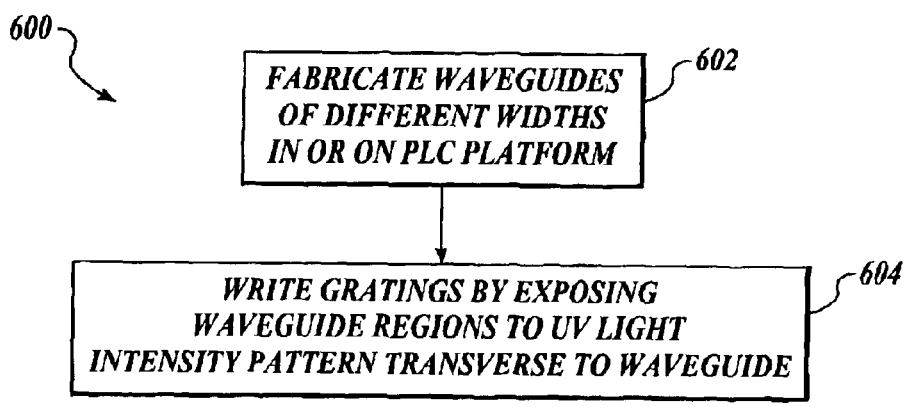
FIG. 6 is a flowchart illustrating an approach to fabricating the photonic device in FIG. 5 according to embodiments of the present invention.

FIG. 6 is a flowchart illustrating a process 600 for making the photonic device 300 according to embodiments of the present invention. A machine-readable medium with machine-readable instructions thereon may be used to cause a processor to perform the process 600. Of course, the process 600 is only an example process and other processes may be used. The order in which the blocks are described should not be construed to imply that these operations are necessarily order-dependent or that the operations be performed in the order in which the blocks are presented.

An operation 602 is performed to fabricate waveguides of different widths in or on a PLC platform using standard semiconductor fabrication techniques. As previously described, these techniques include ion implantation, diffusion doping, evaporation, physical vapor deposition, ion assisted deposition, photolithography, magnetron sputtering, electron beam sputtering, masking, reactive ion etching, and/or other semiconductor fabrication techniques well known to those skilled in the art. In one embodiment of the present invention, the widths of the waveguide regions corresponding to the gratings 312, 314, 316 and 318 are seven microns, six microns, five microns, and four microns, respectively.

An operation 604 is performed to expose the waveguide regions corresponding to the gratings 312, 314, 316, and/or 318, respectively, to a selected UV light intensity pattern. In this embodiment, the UV light intensity pattern is provided in a direction transverse to the longitudinal axes of waveguides 302, 304, 306, and/or 308. This exposure writes the grating with the desired grating spacing in the regions of waveguide 302, 304, 306, and/or 308 for the gratings 312, 314, 316, and/or 318. As previously described, a suitable KrF excimer laser can be used to expose the doped waveguide 302, 304, 306, and 308 regions to the UV light intensity pattern. The UV light intensity pattern may have a height of 300 microns. In one embodiment, the area occupied by these waveguide regions has a width (or height) that is less than 300 microns. Thus, the exposure may write all gratings simultaneously, any one of the gratings individually, or any subset of the gratings simultaneously.

Devices implemented according to embodiments of the present invention may be more compact, simpler to fabricate, and less expensive. For example, in one embodiment, the photonic device 300 may be implemented as a multiple wavelength division multiplexing (WDM) filter in which one or more of the gratings 312, 314, 316, and 318 is separately addressable. For example, the device 300 may be a forty-channel cascaded series of channel dispersion compensating waveguide gratings having twenty-five gigahertz (GHz) spacing. The device 300 thus may be six centimeters long and two centimeters wide. In embodiments in which devices are implemented as chirped waveguide gratings, a controlled tapering of the refractive index may greatly improve "group delay ripple" that can plague gratings produced by the standard chirped phase-mask approach.

Figure 7:
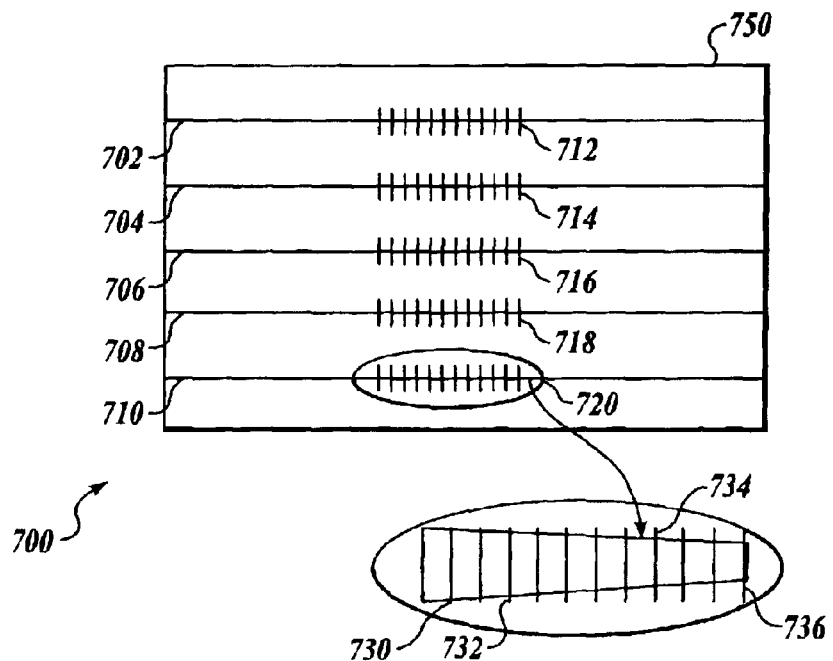
FIG. 7 is a schematic diagram of a photonic device according to an embodiment of the present invention.

FIG. 7 is a schematic diagram of a photonic device 700 according to an embodiment of the present invention. The photonic device 700 includes several waveguides 702, 704, 706, 708, and 710 formed in or on a PLC platform 750. Each waveguide 702, 704, 706, 708, and 710 includes a grating 712, 714, 716, 718, and 720. The waveguides 702, 704, 706, 708, and 710 are similar to the waveguides 302, 304, 306, and 308. The platform 750 is similar to the platform 104.

The gratings 712, 714, 716, 718, and 720 are similar to the gratings 106, 108, and 110 in that the gratings 712, 714, 716, 718, and 720 may be Bragg gratings whose grating spacing are nominally identical. The gratings 712, 714, 716, 718, and 720 are similar to the gratings 312, 314, 316, and 318 in that the center wavelengths are different because each grating 312, 314, 316, and 318 has a different width to give the grating regions of the waveguides 312, 314, 316, and 318 different refractive indices. The gratings 712, 714, 716, 718, and 720 are different from the gratings 312, 314, 316, and 318 in that the width of one or more of the gratings 712, 714, 716, 718 and/or 720 is tapered as shown with respect to the grating 720. As is well known, tapering gives the grating a "chirp" (i.e., a subset of non-uniform refractive indices along the length of the grating). The chirp may vary symmetrically, asymmetrically, either increasing or decreasing. Alternatively, the chirp may be linear (e.g., the refractive index varies linearly with the length of the grating). The chirp may be quadratic, random, or discrete.

In one embodiment of the present invention, the width of the grating 720 at points 730, 732, 734 and 736 may be seven microns, six microns, five microns, and four microns, respectively. After reading the description herein, persons of ordinary skill in the relevant art(s) will readily recognize how to implement various chirps.

Figure 8:
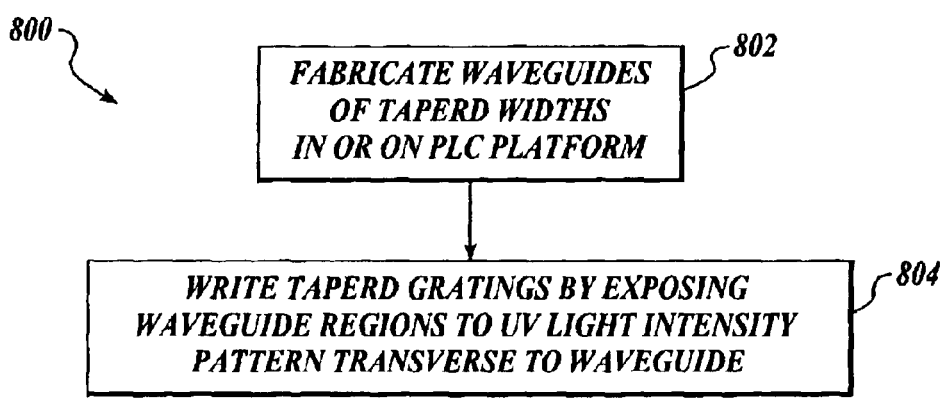
FIG. 8 is a flowchart illustrating a process for making the photonic device illustrated in FIG. 7 according to embodiments of the present invention.

FIG. 8 is a flowchart illustrating a process 800 for making the photonic device 700 according to embodiments of the present invention. A machine-readable medium with machine-readable instructions thereon may be used to cause a processor to perform the process 800. Of course, the process 800 is only an example process and other processes may be used. The order in which the blocks are described should not be construed to imply that these operations are necessarily order-dependent or that the operations be performed in the order in which the blocks are presented.

An operation 802 is performed to fabricate waveguides of tapered widths in or on a PLC platform using standard semiconductor fabrication techniques, such as implantation, doping, evaporation, physical vapor deposition, ion assisted deposition, photolithography, magnetron sputtering, electron beam sputtering, masking, reactive ion etching, and/or other semiconductor fabrication techniques well known to those skilled in the art. In one embodiment of the present invention, the waveguide 702 may be tapered adiabatically. For example, the width or height of the waveguide 702 at the points 730, 732, 734 and 736 may be seven microns, six microns, five microns and four microns, respectively. Of course, other shapes or dimensions are possible in other embodiments.

An operation 804 is performed to expose the waveguide regions corresponding to the gratings 712, 714, 716, and/or 718 to a selected UV light intensity pattern in a direction transverse to the waveguides 702, 704, 706, 708 and 710. The intensity pattern is generated to write the grating in the regions of waveguides 702, 704, 706, 708, and 710 for the gratings 712, 714, 716, and/or 718, respectively, with the desired gating spacing. The exposure may write all gratings simultaneously, any one of the gratings individually, or any subset of the gratings simultaneously. In one embodiment, a suitable KrF excimer laser is used to generate the UV light intensity pattern. The UV light intensity pattern may have a height of 500 microns. In one embodiment, the waveguide regions corresponding to the gratings 712, 714, 716, and/or 718 are closer to each other than 500 microns.

Figure 9:
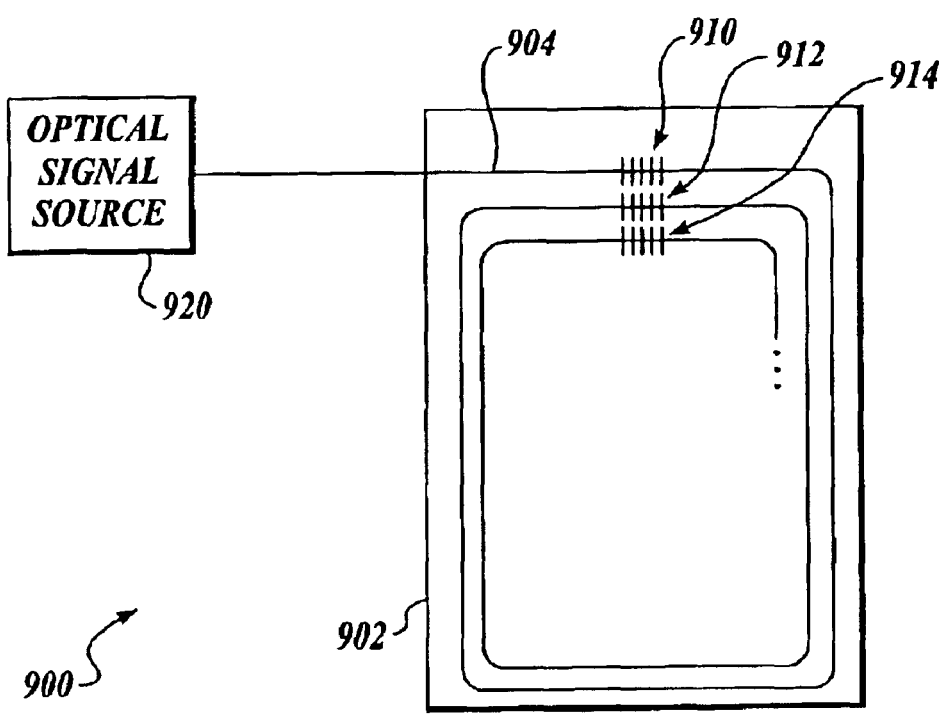
FIG. 9 is a high-level block diagram of a system for making photonic devices according to embodiments of the present invention.

FIG. 9 is a block diagram of a WDM system 900 using photonic devices according to embodiments of the present invention. The WDM system 900 includes a planar lightwave circuit (PLC) 902 having a waveguide 904 formed therein or thereon and gratings 910, 912, and 914 in or on the waveguides 904. These gratings are formed as described above. The system 900 also includes an optical signal source 920 that provides an optical signal to be received by PLC 902. The gratings 910, 912 and 914 provide dispersion compensation across the multiple optical channels of the WDM system. After passing through the cascaded gratings 910, 912, and 914, the optical signal can be propagated to other optical circuitry (not shown). In another embodiment (not shown), PLC 902 may include similar gratings formed in or on separately addressable waveguides to be used as WDM filters.

Embodiments of the invention can be implemented using hardware, software, or a combination of hardware and software. In implementations using software, the software may be stored on a computer program product (such as an optical disk, a magnetic disk, a floppy disk, etc.) or a program storage device (such as an optical disk drive, a magnetic disk drive, a floppy disk drive, etc.).

The above description of illustrated embodiments of the invention is not intended to be exhaustive or to limit embodiments of the invention to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description.

The terms used in the following claims should not be construed to limit the invention to the specific embodiments disclosed in the specification and the claims. Rather, the scope of embodiments of the invention is to be determined entirely by the following claims, which are to be construed in accordance with established doctrines of claim interpretation.

What is claimed is:

1. A method of creating multiple gratings in or on a single planar lightwave circuit (PLC), comprising:

forming a set of regions having different effective refractive indices in a waveguide;

exposing the set of regions to an ultraviolet (UV) intensity pattern to form a set of gratings, wherein the set of gratings have substantially identical grating spacing and different center wavelengths; and wherein forming the set of regions comprises doping the set of different regions so that each region of the set of regions has a doping parameter that is different from that of the other regions of the set of regions.

2. The method of claim 1, wherein the set of regions is exposed simultaneously.

3. The method of claim 1, wherein the set of regions has substantially identical width profiles.

4. The method of claim 3, wherein the set of regions have width profiles that vary along a longitudinal axis of the waveguide.

5. The method of claim 1, wherein one region of the set of regions is doped with a selected dopant at a first concentration and another region of the set of regions is doped with the selected dopant at a second concentration different from the first concentration.

6. The method of claim 1, wherein after doping, one region of the set of regions includes a dopant that is not included in another region of the set of regions.

7. The method of claim 1, wherein a core layer of a region of the set of regions is doped.

8. The method of claim 1, wherein a cladding layer of a region of the set of regions is doped.

9. The method of claim 1, wherein forming the set of regions comprises forming a first region of the set of regions with a geometry that is different from that of a second region of the set of regions.

10. The method of claim 9, wherein the first region has a depth that is different from that of the second region.

11. The method of claim 9, wherein the first region has a width that is different from that of the second region.

12. The method of claim 1, wherein the set of gratings are chirped.

13. The method of claim 1, wherein the waveguide is arranged in a pattern so that regions of the set of regions are proximate to each other.

14. The method of claim 1, wherein forming the set of regions includes hydrogenating selected sections of the set of regions.

15. The method of claim 14, further comprising pre-exposing the selected sections with light before hydrogenating the selected sections.

16. The method of claim 14, wherein ion implantation is used to hydrogenate the selected sections.

17. A product formed by the process of claim 1.

* * * * *